US008792303B2

(12) United States Patent
Downton et al.

(10) Patent No.: US 8,792,303 B2
(45) Date of Patent: Jul. 29, 2014

(54) METHODS AND SYSTEMS FOR PERFORMING AZIMUTHAL SIMULTANEOUS ELASTIC INVERSION

(75) Inventors: Jon Downton, Calgary (CA); Benjamin Roure, Calgary (CA)

(73) Assignee: CGGVeritas Services (U.S.) Inc., Houston, TX (US)

( * ) Notice: Subject to any disclaimer, the term of this patent is extended or adjusted under 35 U.S.C. 154(b) by 600 days.

(21) Appl. No.: 13/046,447

(22) Filed: Mar. 11, 2011

(65) Prior Publication Data

US 2011/0222370 A1      Sep. 15, 2011

Related U.S. Application Data

(60) Provisional application No. 61/313,394, filed on Mar. 12, 2010, provisional application No. 61/340,096, filed on Mar. 12, 2010.

(51) Int. Cl.
*G01V 1/28* (2006.01)
*G01V 1/24* (2006.01)

(52) U.S. Cl.
CPC . *G01V 1/24* (2013.01); *G01V 1/282* (2013.01); *G01V 2210/626* (2013.01)
USPC ............................................. 367/74; 367/73

(58) Field of Classification Search
CPC .................... G01V 1/282; G01V 2210/626
USPC .............................................................. 367/74
See application file for complete search history.

(56) References Cited

U.S. PATENT DOCUMENTS

| 6,665,615 | B2 | 12/2003 | Van Riel et al. | |
| 7,627,431 | B2 | 12/2009 | Angerer et al. | |
| 2006/0253257 | A1* | 11/2006 | Herrmann et al. | 702/17 |
| 2006/0283589 | A1* | 12/2006 | Sayers | 166/254.1 |
| 2010/0149910 | A1 | 6/2010 | Martin | |
| 2011/0182144 | A1 | 7/2011 | Gray | |

OTHER PUBLICATIONS

Mallick, SEG/Houston 2005 Annual Meeting, 2005, pp. 182-186.*
Vavrycuk, V., et al., "PP-wave reflection coefficients in weakly anisotropic elastic media," Geophysics, vol. 63, No. 6, Nov.-Dec. 1998, pp. 2129-2141.
Schoenberg, M., et al., "Seismic anisotropy of fractured rock," Geophysics, vol. 60, No. 1, Jan.-Feb. 1995, pp. 204-211.
Schoenberg, M., et al., "'Zoeppritz' Rationalized and Generalized to Anisotropy," Journal of Seismic Exploration 1, 1992, pp. 125-144.
Winterstein, D. F., "Velocity anisotropy terminology for geophysicists," Geophysics, vol. 55, No. 8, Aug. 1990, pp. 1070-1088.

(Continued)

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

An improved method for analyzing seismic data to obtain elastic attributes is disclosed. In one embodiment, a reflectivity series is determined for at least one seismic trace of seismic data obtained for a subterranean formation, where the reflectivity series includes anisotropy properties of a formation. One or more synthetic seismic traces are obtained by convolving the reflectivity series with a source wavelet. The one or more synthetic seismic traces are inverted to obtain elastic parameters estimates. According to one aspect, the data inputs are angle-azimuth stacks. According to another aspect, the data inputs are azimuthal Fourier coefficients, $u_n$, $v_n$.

19 Claims, 6 Drawing Sheets

(56) References Cited

OTHER PUBLICATIONS

Roy, B., et al., Analytic Correction for Wavelet Stretch due to Imaging, SEG/Houston 2005 Annual Meeting, AVO 2.1, 2005, pp. 234-238.

Ruger, A., "Variation of P-wave reflectivity with offset and azimuth in anisotropic media," Geophysics, vol. 63, No. 3, May-Jun. 1998, pp. 935-947.

Ruger, A., "Reflection Coefficients and Azimuthal AVO Analysis in Anisotropic Media," Doctoral Thesis, Geophysics, Center for Wave Phenomena, Golden, CO, USA, CWP-235, Dec. 1996, pp. 1-141.

Hudson, J. A., "Wave speeds and attenuation of elastic waves in material containing cracks," Geophys. J. R. astr. Soc, vol. 64, 1981, pp. 133-150.

Gray, D., et al., "An Azimuthal-AVO-Compliant 3D Land Seismic Processing Flow," Frontiers + Innovation—2009 CSPG CSEG CWLS Convention, Canada, 2009, pp. 1-4.

Coulon, J-P., et al., "Stratigraphic Elastic Inversion for Seismic Lithology Discrimination in a Turbiditic Reservoir," SEG Expanded Abstracts, 25, No. 1, 2006, pp. 2092-2096.

International Search Report for PCT/US2011/028096 mailed May 17, 2011.

Written Opinion for PCT/US2011/028096 mailed May 17, 2011.

King, M., "Number of Terms Required in the Fourier Expansion of the Reflection Function for Optically Thick Atmospheres," J. Quant. Spectrosc. Radiat. Transfer, vol. 30, No. 2, 1983, pp. 143-161.

Fatkhan, "Effects of Fracture Parameters in an Anisotropy Model on P-Wave Azimuthal Amplitude Responses," Proc. ITB Eng. Science, vol. 38 B, No. 2, 2006, pp. 159-170.

Psencik, I., "Properties of Weak Contrast PP Reflection/Transmission Coefficients for Weakly Anisotropic Elastic Media," Studia Geoph. et geod. 45, 2001, pp. 176-199.

Goodway, B., et al., "Practical Applications of P-Wave AVO for Unconventional Gas Resource Plays—I: Seismic Petrophysics and Isotropic AVO," CSEG Recorder, 2006 Special Edition, pp. 90-95.

Sayers, C., et al., "Microcrack-induced Elastic Wave Anisotropy of Brittle Rocks," Journal of Geophysical Research, vol. 100, No. B3, Mar. 10, 1995, pp. 4149-4156.

Bakulin, A., et al., "Estimation of Fracture Parameters from Reflection Seismic Data—Part II: Fractured Models with Monoclinic Symmetry," Geophysics, vol. 65, No. 6, Nov.-Dec. 2000, pp. 1818-1830.

* cited by examiner

METHODS AND SYSTEMS FOR PERFORMING AZIMUTHAL SIMULTANEOUS ELASTIC INVERSION

CROSS-REFERENCE TO RELATED APPLICATIONS

This application claims priority to Provisional Application Nos. 61/313,394 and 61/340,096, filed on Mar. 12, 2010, and entitled METHODS AND SYSTEMS FOR PERFORMING AZIMUTHAL SIMULTANEOUS ELASTIC INVERSION, the disclosures of which are incorporated by reference.

TECHNICAL FIELD

The present disclosure relates generally to geophysics and, in particular, methods and systems for performing inversion of seismic data. More specifically, the present disclosure concerns improved techniques of analyzing seismic data to obtain elastic attributes such as azimuthal anisotropy data, or data based on a transversely isotropic model with a horizontal axis of symmetry (HTI anisotropy).

BACKGROUND OF THE INVENTION

Typically, in the field of oil and gas exploration and recovery, analysis of seismic data obtained through seismic surveys can provide crucial physical parameters of subterranean rock formations. Generally, in seismic surveys, a seismic energy source is used to generate a seismic signal that propagates into the earth and is at least partially reflected by subsurface formations having different acoustic impedances. The reflections are recorded by seismic detectors located at or near the surface of the earth, in a body of water, or at known depths in boreholes. Conventional surface seismic surveys record compressional, or P-waves. Multicomponent seismic surveys record both P-waves, or compressional waves, and shear, or S-waves. Accordingly, the recorded seismic data is a combination of source wavelet and earth properties. As such, the goal of seismic data processing is to interpret earth properties to remove or minimize the effects of the source wavelet.

Generally, for P-waves, the vibrations occur in the direction of propagation of the waves, and for S-waves, the vibrations occur in a direction generally orthogonal to the direction of propagation of the waves. If the earth is isotropic with respect to the horizontal direction of wave motion, then a single S-wave arrival may be expected for each reflecting interface. As is often the case, however, subterranean formations behave anisotropically with respect to the horizontal direction for various reason, such as the geological layers contain fractures. Consequently, in an horizontally stratified azimuthally anisotropic media, two separate S-waves from each reflecting interface are recorded, where the S-waves arrive at different times, having propagated with different velocities.

Seismic data processing methods include azimuthal velocity correction and amplitude versus offset (AVO) analysis and inversion, amplitude versus offset and azimuth (AVOA or AVAZ—Amplitude Versus Angle and aZimuth) analysis and inversion of conventional three dimensional (3D) seismic data, and birefringence analysis of multicomponent 3D seismic data. The reflectivities, such as AVO, characterize subterranean properties and can serve as input to other inversion algorithms. In addition, the source wavelet is useful for a variety of seismic processing algorithms, including forward modeling of seismic data. The analyzed seismic data can provide useful information regarding the characteristics and parameters of the subterranean formation. Further, seismic detection of subsurface fractures has important applications in the study of unconventional rock formations such as shale plays, tight gas sands and coal bed methane, as well as carbonates, where the subterranean formations are naturally fractured reservoirs.

Information concerning these characteristics and parameters are often essential in a variety of fields such as underground transportation systems, foundations of major structures, cavities for storage of liquids, gases or solids, and in prediction of earthquakes. In oil and gas exploration, the information is important for determining optimal locations and orientations of vertical, inclined or deviated, and horizontal wells, minimizing wellbore instability, and formation break-out. Also, these characteristics are crucial to optimize the operating parameters of a commonly utilized technique for stimulating the production of hydrocarbons by applying hydraulic pressure on the formation from the wellbore. The outputs from the inversions of the embodiments of the present disclosure contain estimates of the elastic stiffnesses (velocities and anisotropic parameters) that can be used to predict lithology, porosity and the fluid content of the subsurface, as well as in predictions of intensity and orientation of fractures in subterranean formations.

The prior art seismic data processing methods have significant drawbacks and limitations. For instance, conventional Azimuthal AVO inversions provide only band-limited fractional elastic parameters estimates with reduced resolution and quality. That is, the bandwidth of seismic data is always less than the bandwidth of the desired reflectivities. Generally, conventional Azimuth AVO inversions involve the equation set forth by Rüger, A., 2002, "Reflection coefficients and azimuthal AVO Analysis in anisotropic media," SEG geophysical monograph series number 10: Soc. Expl. Geophys (hereinafter "Rüger"). Rüger provides the equation showing the amplitude R with azimuth $\phi$ for narrow angles of incidence $\theta$ for an isotropic half-space over an HTI anisotropic half-space. The Rüger equation is nonlinear and can be linearized to simplify the inversion. Once in linear form, the parameters may be estimated in a straightforward fashion through least squares inversion. Transforming the parameters back to their original form results in estimates of the P-impedance reflectivity, isotropic gradient, anisotropic gradient and the isotropy plane azimuth of the HTI media. It can be shown that if fractures behave similar to the penny shaped crack theory of Hudson, disclosed in J. A., 1981, "Wave speeds and attenuation of elastic waves in material containing cracks," Geophys. J. Royal Astronom. Soc. 64, 133-150 (hereinafter "Hudson"), then there is a direct relation between the anisotropic gradient and the fracture density. Further the isotropy plane describes the strike of the fracture. There are, however, a number of limitations to this method. In particular, the Rüger equation is derived for the case of an isotropic over HTI anisotropic half-space. It is not theoretically valid for the case of two anisotropic half-spaces. Further, there is a 90 degree ambiguity associated with the estimate of the isotropy plane, as indicated by Rüger. Moreover, for noise stability reasons, this method is usually implemented using a near offset approximation, which leads to bias in the parameter estimates.

Another known method is simultaneous prestack elastic inversion, such as that disclosed by Coulon, J-P, Lafet, Y., Deschizeaux, B., Doyen P. M. and Duboz, P., 2006, "Stratigraphic elastic inversion for seismic lithology discrimination in a turbiditic reservoir," SEG Expanded Abstracts, 25, no. 1, 2092-2096 (hereinafter "Coulon"). This method addresses the band-limited fractional parameters by estimating isotropic elastic parameters. There are, however, still drawbacks to this method because it assumes an isotropic earth, thereby losing all the information associated with the anisotropic parameters such as fracture information. Further, overlooking these anisotropic parameters introduce systematic errors into such method.

In view of the drawbacks of methods known in the art, there is a great need for reliable and accurate estimation and modeling of elastic attributes of subterranean formations. The present disclosure provides for improved methods and systems that produce reliable estimates of elastic parameters of subterranean formations.

BRIEF SUMMARY OF THE INVENTION

The present disclosure provides an improved method for estimating elastic parameters that considers the anisotropic elastic properties of the subterranean formation. The present disclosure overcomes the problems associated with methods known in the art. For example, the present disclosure provides for a model of angle-limited seismic traces using the anisotropic Zoeppritz equation to generate equivalent reflectivity volumes which are then convolved with appropriate user defined wavelets, generating 3D volumes of the fracture parameters. As such, rather than producing fractional elastic parameter estimates, the embodiments of the present disclosure produce elastic parameter estimates. Also, the embodiments of the present disclosure incorporate wavelets and can handle anisotropic over anisotropic layers. Further, the present disclosure allows each calculated layer to be HTI anisotropic with an arbitrary rotation for the symmetry axis. Unlike known methods, by calculating the reflectivity using the anisotropic Zoeppritz equation or some linearization of this, the embodiments of the present disclosure do not rely on some near offset approximation to enhance stability. Lastly, the present invention removes the 90 degree symmetry axis ambiguity. In addition, the present disclosure provides for alternative parameterizations using rock physics models to reduce and constrain the solution space.

Furthermore, the present disclosure provides for a new and innovative way of estimating elastic parameters by incorporating anisotropic elastic properties. As mentioned above, the present invention incorporates various forward models, e.g., the Zoeppritz equation. Also, the various aspects of the present disclosure can use various ways of defining the necessary parameters, parameterization, such as the Thomsen parameters. Alternative parameterizations include incorporating fractured rock physics such as the penny-shaped crack model disclosed in Hudson or linear slip deformation (LSD) theory disclosed by Schoenberg, M. and Sayers, C. M., 1995, "Seismic anisotropy of fractured rock" Geophysics, 60, 1, pp. 204-211 (hereinafter "Schoenberg and Sayers"). These theories describe how fractures lead to anisotropy. For example, the disclosures of Bakulin, et. al., 2000, "Estimation of fracture parameters from reflection seismic data—Part II: Fractured models with orthorhombic symmetry," Geophysics, 65, 6, pp. 1803-1817, describe one way fractures can lead to orthorhombic media. Also, Sayers, C. M. and Kachanov M., 1995, "Microcrack-induced elastic wave anisotropy of brittle rocks" J. Geophysical Research, 100, pp. 4149-4156, shows how two fractures can lead to anisotropic media.

According to one aspect, the present disclosure provides a method comprising the step of determining a HTI stiffness matrix from seismic data, using parameterization means, for at least one azimuth and at least one angle of incidence, wherein the HTI stiffness matrix varies spatially with respect to one or more layers. The method further includes the steps of applying a Bond transformation to the HTI stiffness matrix to rotate the isotropy symmetry plane such that it is referenced with respect to true North; and calculating a reflectivity series for the at least azimuth and angle of incidence using the Zoeppritz equation, wherein anisotropy media is incorporated.

According to certain embodiments of the present disclosure, the reflectivity is calculated in the forward modeling step using the Zoeppritz equation. In some embodiments, the reflection coefficients are calculated using a linearization of the anisotropy Zoeppritz equation. In other embodiments, the forward modeling begins with determining the spatially varying HTI stiffness matrix from seismic data using parameterization means. In one embodiment, the parameterization is performed with the linear slip deformation theory. In another embodiment, the parameterization is performed with the Hudson's penny-shaped crack theory. In yet another embodiment, the parameterization is performed with Thomsen parameters. The forward modeling proceeds with the Bond transformation, which then applied to the HTI stiffness matrix to rotate the isotropy symmetry plane so it is referenced with respect to true North. The rotated HTI stiffness matrix serve as inputs to calculate the reflectivity using the Zoeppritz equation. Alternatively, the reflectivity is calculated using the approximate linearized Zoeppritz equation, wherein the stiffness matrix is expressed in terms of Weak Anisotropy Parameters.

In some embodiments, the reflectivity is calculated for each azimuth, angle of incidence, and interface. Synthetic seismic traces for one or more azimuths and angle of incidences that represent the seismic data recorded are calculated from the convolution of a reflectivity series for the one or more azimuths and angle of incidences and a wavelet.

In some embodiments, the elastic parameters are estimated by inverting the synthetic seismic traces. In one embodiment, the inversion method iteratively perturbs the initial model containing P-wave velocity, Vp, S-wave velocity, Vs, and density, $\rho$. In other embodiments, the initial model also includes anisotropic parameters. In alternative embodiments, these parameters can be perturbed independently or coupled via relationships such as the Gardner's relation linking Vp and $\rho$. In other aspects, the embodiments of the present disclosure also perturb the time-thickness of the micro-layers so as to reduce the data misfit and enhance lateral coherence. The inversion method uses simulated annealing to find a global solution which minimizes the objective function. In other embodiments, the objective function contains a data misfit and regularization term. The regularization term includes a three dimensional spatial continuity constraint to help attenuate the effects of random noise. In other embodiments, the iteration is performed on all azimuthal-incidence angle stacks simultaneously such that data misfit is minimized and avoid penalties in the regularization term.

According to another aspect of the present disclosure, the present disclosure provides a method for performing azimuthal simultaneous elastic inversion comprising the steps of determining a reflectivity series for at least one seismic trace of seismic data obtained for a subterranean formation, wherein the reflectivity series includes anisotropy properties of said formation; obtaining one or more synthetic seismic traces by convolving the reflectivity series with a source wavelet; and estimating elastic parameters by inverting the one or more synthetic seismic traces. In embodiment, the reflectivity series comprises Fourier coefficients characterizing azimuthal reflectivity at an angle of incidence $\theta$, wherein said reflectivity is determined at least by $$R(\phi, \theta) = \frac{u_0}{2} + \sum_{n=1}^{N}(u_n(\theta)\cos(n\phi) + v_n(\theta)\sin(n\phi)).$$

In another embodiment, the inverting step comprises constructing one or more misfit weighting functions that decouple fracture parameter estimation from density, P-wave background velocity estimation, and S-wave background velocity estimation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
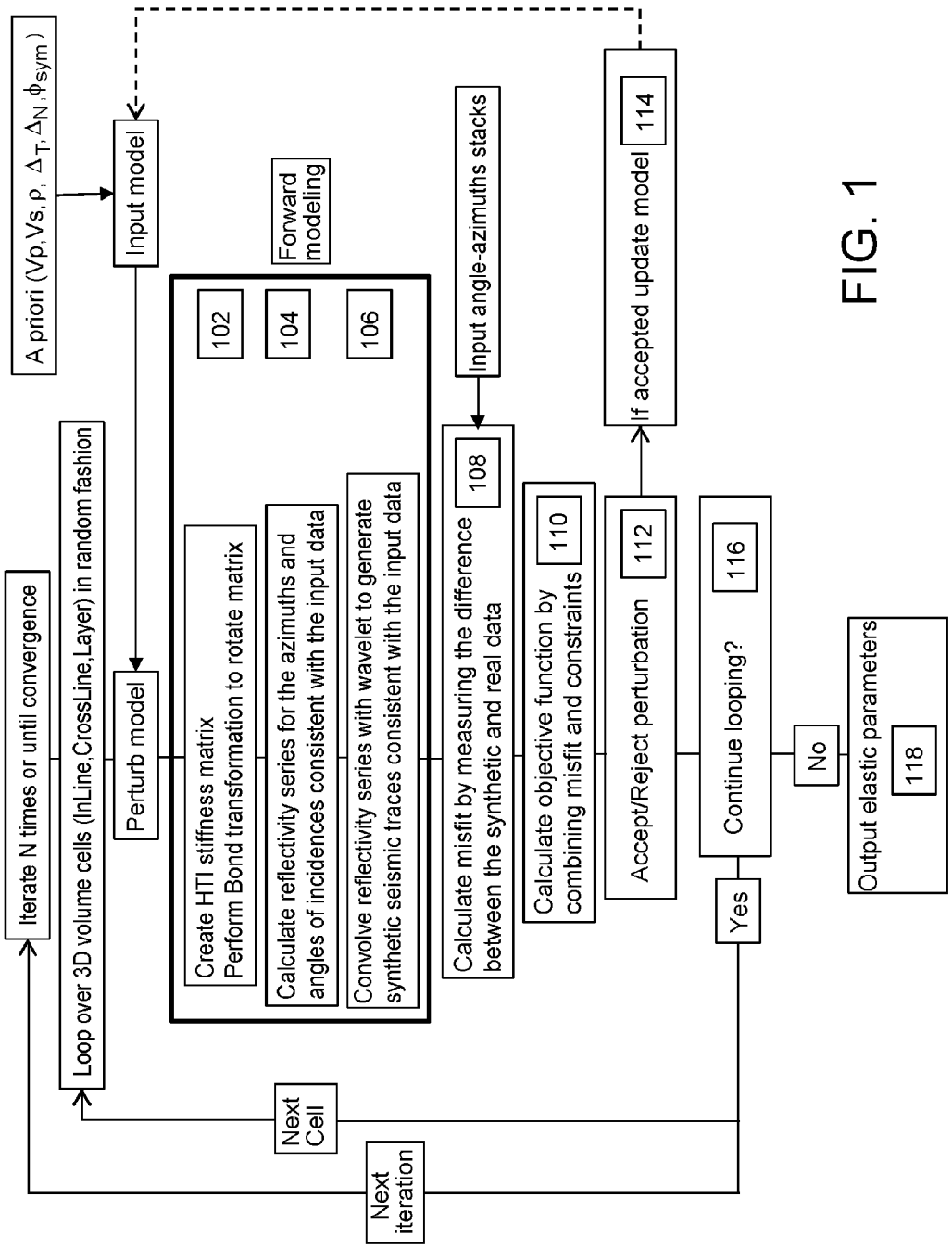
FIG. 1 is a flow diagram of one embodiment of a method for performing azimuthal simultaneous elastic inversion according to one aspect of the present disclosure.

This application incorporates by reference the provisional application with Application No. 12634169. The present disclosure is directed to a method for analyzing seismic data to estimate elastic parameters of the subterranean formation. Specifically, the present disclosure provides methods and systems to perform simultaneous elastic inversion for HTI anisotropic media.

Further, the various embodiments of the present disclosure can be implemented via computer-executable instructions, various elements of embodiments of the present disclosure are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

In addition, a brief discussion of the mathematical and theoretical concepts behind the embodiments of the present disclosure may prove beneficial and are presented below. Further, the following notations and their definitions are used herein:

$c_{ij}$: is the stiffness for element i, j, where (i, j∈[1,6]).

$A_{ij}$: is the density normalized stiffness for element i, j, where (i, j∈[1,6]).

$\xi$: is the crack density and $$\xi = \frac{3\phi_s}{4\pi a}.$$

where $\phi_s$: is the porosity for a given crack geometry (Hudson, 1980)

$$\phi_s = \frac{4}{3}N\pi\bar{r}^3 a$$

a: is the aspect ratio of the crack $\bar{r}$: is the mean radius, and

N: is the number of cracks $\alpha$: is the vertical compressional velocity where $\alpha^2 = A_{33}$.

$\beta$: is the vertical shear-wave velocity where $\beta^2 = A_{55}$, $\rho$: is the density.

Z: is the acoustic impedance where $Z = \rho\alpha$, $\mu$: is the rigidity of rock, or shear modulus, where $\mu = \rho\beta^2$.

$\lambda$: is the Lame parameter where $\lambda = \rho\alpha^2 - 2\rho\beta^2$.

M: $M = \lambda + 2\mu$ thus $M = \rho\alpha^2$.

$\alpha_0$: is the vertical compressional-wave velocity of unfractured material.

$\beta_0$: is the vertical shear-wave velocity of unfractured material.

$\rho_0$: is the density of unfractured material.

$g_0$: is the square of the unfractured $\beta_0/\alpha_0$ ratio.

g: is the square of the $\beta/\alpha$ ratio.

$\eta_{liq}$: is the ratio of liquid M to unfractured rock M.

$\delta$: is the Thomsen parameter (for HTI media) describing the deviation from elliptical for P-wave velocity.

$\epsilon$: is the Thomsen parameter (for HTI media) describing fractional difference between fast and slow P-wave velocity.

$$\gamma^{(s)} = \frac{c_{44} - c_{55}}{2c_{55}};$$

is the Thomsen parameter (for HTI media) describing fractional difference between fast and slow S-wave velocity.

The isotropic parameters (e.g., the P-wave and S-wave velocities of the unfractured media) may be equivalently parameterized in terms of the compressional-wave velocity, shear-wave velocity, Lamé parameter $\lambda$, and rigidity $\mu$.

Definitions for angles: in general angles are measured anti-clockwise from x-axis.

$\psi_{sym}$: represents the clockwise angle between the Symmetry axis and the x-axis. For non-rotated HTI media $\psi_{sym}$=0.

$\psi_{iso}$: represents the azimuth of Isotropy plane, which is a clockwise rotation with respect to the x-axis. The Isotropy plane is a 90 degree rotation from the Symmetry plane. That is, $\psi_{iso}$=$\psi_{sum}$+90.

$\psi_{SR}$: represents the azimuth of the source to receiver, which is the angle reference counterclockwise with respect to the x-axis.

$\psi$: represents the counterclockwise rotation about the z-axis used in Bond transformation with reference to the x-axis.

$\psi$=$\psi_{SR}$−$\psi_{sum}$ for AVAZ, with $\psi_{sym}$=$\psi_{iso}$−90. It is, however, referenced with respect to the North direction.

If elastic property has subscript zero 0 then it is the unfractured medium.

Referring to FIG. 1, in one embodiment, the simultaneous inversion algorithm takes multiple angle-stacked seismic data sets, i.e., angle of incidence and azimuthal angle, and generates elastic parameter volumes as outputs: P-impedance, S-impedance, density, and anisotropic properties. This is achieved through a forward modeling component and an inversion component. In addition, the elastic parameters can be constrained according to rock physics relationships. The forward modeling component of the present disclosure calculates the reflectivity using the anisotropic Zoeppritz equation or some linearization of this to reflect the properties of anisotropic media. In one aspect, the inputs to the azimuthal simultaneous elastic inversion algorithm are angle stacks, i.e., angle of incidence and azimuthal angle, and some initial layered elastic model defined in the time domain. By using angle stacks, NMO (normal-moveout) stretch and scaling issues can be addressed by varying the wavelet as a function of angle of incidence and/or of azimuth. One example of NMO stretch is disclosed by disclosed by Roy, B., Anno, P., Baumel R., Durrani, J., 2005, "Analytic Correction for Wavelet Stretch due to Imaging," SEG Convention, AVO 2.1, 234-237. Otherwise, the wavelet phase and frequency need to be estimated; typically through the use of the reflection coefficients. Further, using angle stacks as inputs eliminates the need to perform ray tracing, thereby simplifying the forward modeling component of the azimuthal simultaneous elastic inversion algorithm.

Figure 2:
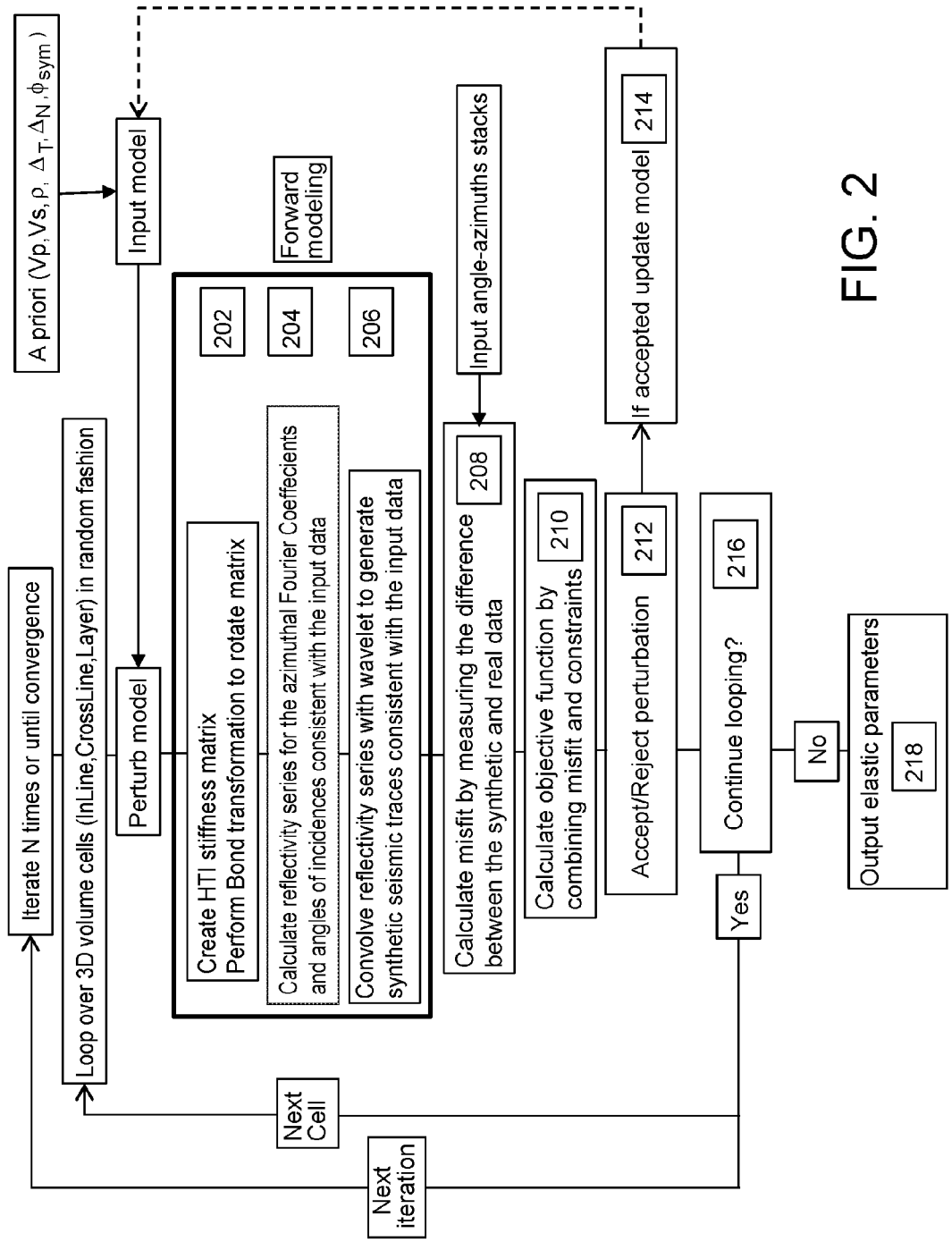
FIG. 2 is a flow diagram of another embodiment of a method for performing azimuthal simultaneous elastic inversion according to one aspect of the present disclosure.

Referring to FIG. 2, in another embodiment of the disclosure, instead of inputting angle-azimuth stacks, the data inputs are azimuthal Fourier coefficients, $u_n$, $v_n$. These Fourier coefficients may be calculated from the azimuth stacks for a particular angle of incidence using a discrete Fourier Transform. The cosine Fourier coefficient terms $u_n$ are calculated according to the following equation:

$$u_n(\theta) = \frac{2}{N} \sum_{n=1}^{N} R(\phi, \theta) \cos(n\phi) d\phi$$

for integer values of n greater than or equal to zero. Likewise, the sine Fourier coefficient terms $v_n$ are calculated using $$v_n(\theta) = \frac{2}{N} \sum_{n=1}^{N} R(\phi, \theta) \sin(n\phi) d\phi$$

Figure 3:
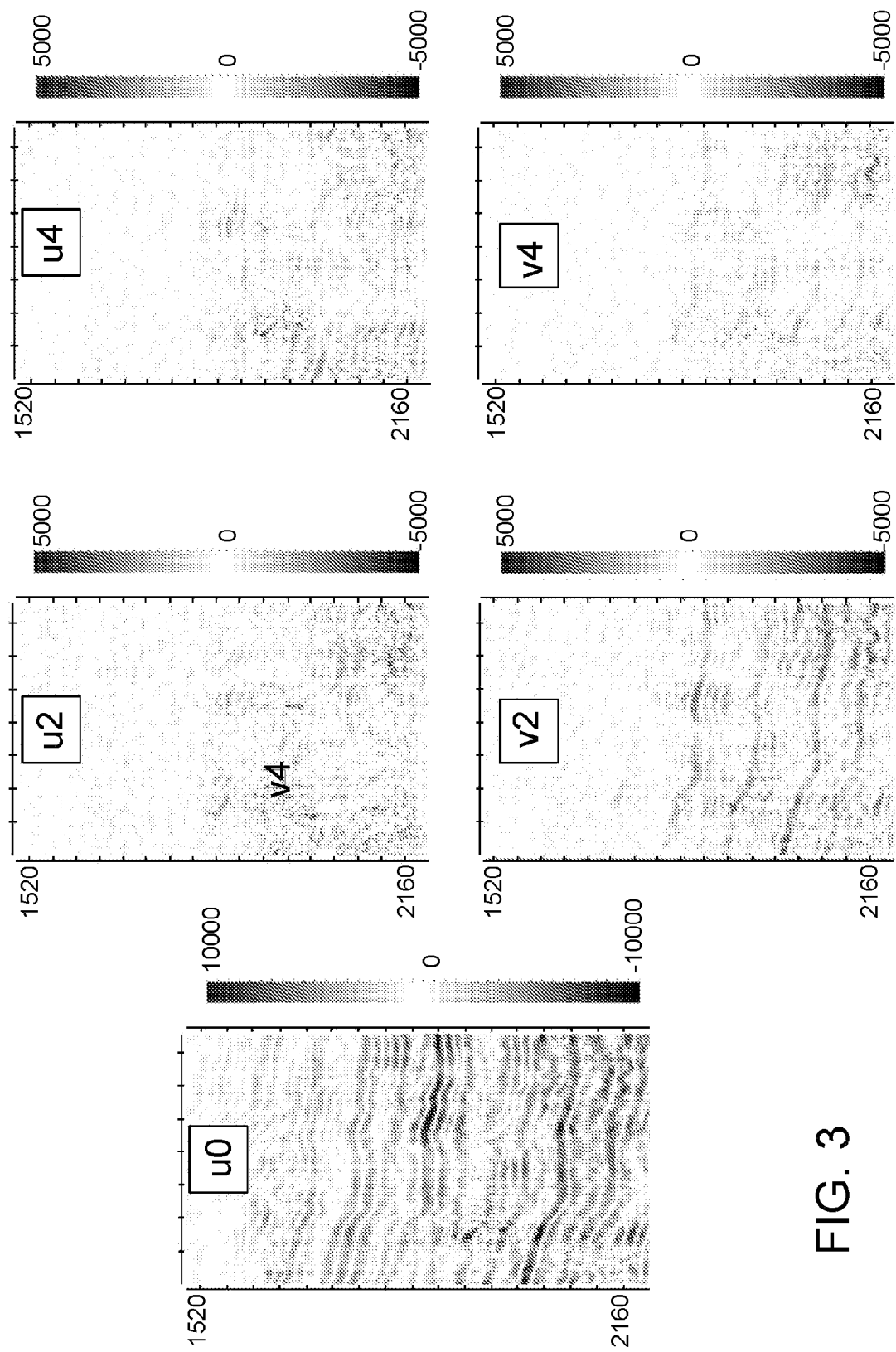
FIG. 3 is exemplary of Fourier coefficients that serve as inputs in one embodiment to the data misfit calculation according to one aspect of the present disclosure.

Alternatively, these Fourier coefficients may be calculated from irregularly sampled seismic data provided the offset and azimuth is known and there exists a mapping from offset to angle of incidence. For the case of irregular sampling the calculation of the Fourier coefficients can be treated as a least squares inverse problem. These coefficients are calculated at a variety of angle of incidences. Once these Fourier coefficients are known the azimuthal reflectivity, $R(\phi,\theta)$ for a particular interface and angle of incidence $\theta$ may be calculated using the following equation:

$$R(\phi, \theta) = \frac{u_0}{2} + \sum_{n=1}^{N} (u_n(\theta)\cos(n\phi) + v_n(\theta)\sin(n\phi)) \quad (1)$$

where $\phi$ is the azimuth. If a linear approximation of the Zoeppritz equations is used, only the $u_0$, $u_2$, $u_4$, $v_2$ and $v_4$ Fourier coefficients are non-zero and need be calculated. FIG. 3 shows an example of these Fourier coefficients. Because only the $u_0$, $u_2$, $u_4$, $v_2$ and $v_4$ Fourier coefficients needing to be determined, there is a reduction in data space leading to algorithmic efficiencies.

In certain aspects, the present disclosure of azimuthal simultaneous elastic inversion takes azimuthal anisotropy information defined by Fourier coefficients and generates elastic parameter volumes as outputs: P-impedance, S-impedance, density, and anisotropic properties. Using Fourier coefficients as inputs provides certain advantages, such as reducing the input data amount, leading to reduced data space required or used and improved operational performance. In one embodiment (such as FIG. 2), if a linear approximation of the Zoeppritz equations is used to model the data, only the $u_o$, $u_2$, $u_4$, $v_2$, and $v_4$ coefficients may be calculated directly and stored for future comparison to the input seismically derived Fourier coefficients. Further, these coefficients represent unique and independent information and allow for easier quality-control. Additionally, the Fourier coefficients inputs allow for improved speed in determining convergence and stability of the estimates.

Generally, for fractured media, the anisotropic gradient is often claimed to be proportional to crack density while the isotropy plane is thought to be the strike of the fractures. There are a number of assumptions and limitations with this model, which the embodiments of the present disclosure addresses. As described by Goodway, B., Varsek J., and Abaco, C., 2006, "Practical applications of P-wave AVO for unconventional gas Resource Plays," CSEG Recorder, vol. 31, no 4, 52-65, the near offset approximation is susceptible to theoretical error introduced by the far offset terms. In addition, the anisotropic gradient is actually a function of Thomsen's anisotropic parameters delta, $\delta$, and gamma, $\gamma$. Thomsen parameters (i.e., delta, $\delta$, epsilon, $\epsilon$, and gamma, $\gamma$) are known in the art as dimensionless elastic moduli that characterize anisotropic materials. These two anisotropic parameters, $\delta$ and $\gamma$, may not be correlated in the same fashion to crack density, giving rise to potentially a complex relation between crack density and the anisotropic gradient.

As mentioned above, the reflectivity calculation needs to be modified to incorporate anisotropic media. Preferably, this is done by parameterization of the HTI layered medium in terms of the following parameters: (1) the layer time-thickness, (2) P-wave impedance, (3) S-wave impedance, (4) density, the Thomsen parameters (5) delta, (6) epsilon, and (7) gamma, and (8) the azimuth of the isotropy plane. As seen, the subterranean formation is characterized by at least eight (8) free parameters per layer. Accordingly, the introduction of HTI anisotropy adds four additional parameters to the four parameters of the isotropic inverse problem (i.e., three Thomsen parameters and azimuth of the isotropy plane). To address the problem of whether reliable estimates of all these parameters can be obtained, the present disclosure reduces the number of free parameters solved for by making use of rock physics models, such as the LSD theory of Schoenberg and Sayers. Alternatively, the solution space can be reduced by using the Hudson's penny shaped crack theory.

Preferably, the seismic data used in the present disclosure has been pre-conditioned. One possible way to perform this preconditioning is discussed in Gray, D., Schmidt, D., Nagarajappa, P., Ursenbach, C., and Downton J., 2009, "CACP azimuthal processing," CSPG CSEG CWLS joint convention.

Referring to FIG. 1, in one embodiment, a HTI stiffness matrix for a particular spatial location (layer, inline, crossline) is calculated from the perturbed parameters. The HTI stiffness matrix may be created and transform with the Bond transformation, as shown in step 102. The input parameterization can be done with the LSD theory of Schoenberg and Sayers (1995), which introduces two parameters to describe how cracks impact the rock: (1) normal weakness, which impacts P-wave velocity and is a function of fluid, crack density and aperture, and (2) tangential weakness, which impacts S-wave velocity and is a function of crack density. The LSD theory reduces the number of parameters describing the HTI stiffness matrix by one. In this embodiment, the stiffness matrix, c, is described by the isotropic parameters $\lambda$ and $\mu$, and the normal and tangential weaknesses $\Delta_N$ and $\Delta_T$. These weakness parameters describe how fractures weaken a background isotropic rock. As such, the stiffness matrix is Under this definition, the isotropy plane or the plane of the fracture is the (y,z) plane, with the symmetry axis as the x-axis. This follows from the fact that the P-wave velocity is the same along the y and z axis, implying that the x-axis is the axis of symmetry. The (x,y) reference system at this point is arbitrary. Further, the vertical P-wave and S-wave velocity can be calculated from the density normalized stiffness matrix, as defined above:

$$\alpha^2 = A_{33} \quad (4)$$

$$\beta^2 = A_{55} \quad (5)$$

Referring to FIG. 1, in another embodiment, the parameterization of step 102 can be done with Hudson's penny shaped crack model, which can reduce the freedom. This model generates fractional weakness parameters and is a subset of the Linear Slip Deformation theory. The fractional tangential weakness is defined as:

$$\Delta_T = \frac{16\varepsilon}{3(3 - 2g_0)} \quad (6)$$

and the normal weakness is defined as:

$$\Delta_N^{wet} = \frac{4\varepsilon}{3g_0(1 - g_0)} \frac{1}{\left(1 + \frac{1}{g_0(1 - g_0)}\varsigma\right)} \quad (7)$$

$$c = \begin{pmatrix} M(1-\Delta_N) & \lambda(1-\Delta_N) & \lambda(1-\Delta_N) & 0 & 0 & 0 \\ \lambda(1-\Delta_N) & M(1-\chi^2\Delta_N) & \lambda(1-\chi\Delta_N) & 0 & 0 & 0 \\ \lambda(1-\Delta_N) & \lambda(1-\chi\Delta_N) & M(1-\chi^2\Delta_N) & 0 & 0 & 0 \\ 0 & 0 & 0 & \mu & 0 & 0 \\ 0 & 0 & 0 & 0 & \mu(1-\Delta_T) & 0 \\ 0 & 0 & 0 & 0 & 0 & \mu(1-\Delta_T) \end{pmatrix} \quad (2)$$

where $$\chi = \frac{\lambda}{M} = 1 - 2g_0$$

$$g_0 = \beta_0^2 / \alpha_0^2$$

$$M = \lambda + 2\mu$$

Both the normal and tangential weakness parameters are bound between zero and one: $\Delta_N \in [0,1)$, $\Delta_T \in [0,1)$.

Dividing the stiffness matrix by density results in the density normalized stiffness matrix.

$$A = \begin{pmatrix} \frac{M}{\rho}(1-\Delta_N) & \frac{\lambda}{\rho}(1-\Delta_N) & \frac{\lambda}{\rho}(1-\Delta_N) & 0 & 0 & 0 \\ \frac{\lambda}{\rho}(1-\Delta_N) & \frac{M}{\rho}(1-\chi^2\Delta_N) & \frac{\lambda}{\rho}(1-\chi\Delta_N) & 0 & 0 & 0 \\ \frac{\lambda}{\rho}(1-\Delta_N) & \frac{\lambda}{\rho}(1-\lambda\chi\Delta_N) & \frac{M}{\rho}(1-\chi^2\Delta_N) & 0 & 0 & 0 \\ 0 & 0 & 0 & \frac{\mu}{\rho} & 0 & 0 \\ 0 & 0 & 0 & 0 & \frac{\mu}{\rho}(1-\Delta_T) & 0 \\ 0 & 0 & 0 & 0 & 0 & \frac{\mu}{\rho}(1-\Delta_T) \end{pmatrix} \quad (3)$$

The Hudson theory presents anisotropy as a function of crack density:

$$\xi = \frac{3\phi_s}{4\pi a} \quad (8)$$

which in turn is a function of the following:
α: aspect ratio of the crack
$\phi_s$: porosity for a given crack geometry and where $$\phi_s = \frac{4}{3} N \pi \bar{r}^3 a$$

$\bar{r}$: is the mean radius, and N is the number of cracks
The "fluid" parameter $$\varsigma = \frac{\eta_{liq}}{\pi a}$$

has been introduced to reduce the number of free parameters and is a function of the fluid and the aspect ratio. If the value of ζ is extremely large (for example brine filled cracks with an extremely small aspect ratio) then this will force $\Delta_N^{wet} \to 0$. If this can be specified a priori, one can reduce the number of parameters by one again.

Hudson model parameters can be calculated from $\Delta_N^{wet}$ and $f_T$ as follows:

$$\xi = \frac{3}{16}(3 - 2g_0)\Delta_T \quad (9)$$

$$\varsigma = \frac{4}{3}\frac{\xi}{\Delta_N^{wet}} - g_0(1 - g_0) \quad (10)$$

Referring to FIG. 1, In yet another embodiment, the parameterization of step 102 can be done with Thomsen parameters. That is, the HTI stiffness matrix can be written in terms of Thomsen parameters, as follows.

$$\varepsilon^{(v)} \equiv \frac{c_{11} - c_{33}}{2c_{33}} \quad (11)$$

$$\delta^{(v)} \equiv \frac{(c_{13} + c_{55})^2 - (c_{33} - c_{55})^2}{2c_{33}(c_{33} - c_{55})} \quad (12)$$

$$\gamma^{(v)} \equiv \frac{c_{66} - c_{44}}{2c_{44}} \quad (13)$$

That is, the HTI stiffness matrix coefficients are defined in terms of these parameters by using the inverse relationships.

If LSD is assumed, then the HTI Thomsen parameters can be calculated from the normal and tangential weaknesses:

$$\gamma^{(v)} = -\frac{1}{2}\Delta_T \quad (14)$$

$$\varepsilon^{(v)} = \frac{2g(g-1)\Delta_N}{1 - (1-2g)^2 \Delta_N} \quad (15)$$

-continued $$\delta^{(v)} = \frac{-2g[(1-2g)\Delta_N + \Delta_T][1 - (1-2g)\Delta_N]}{(1 - \Delta_N(1-2g)^2)\left(1 + \frac{1}{(1-g)}(g\Delta_T - \Delta_N(1-2g)^2)\right)} \quad (16)$$

If this relationship is used, it reduces the degree of freedom by one (two weakness parameters versus three Thomsen parameters). As discussed above, $\gamma^{(v)}$ is solely a function of tangential weakness, and thus, is a function of crack density under the Hudson theory.

The linearized forms of equations 14-16 are as follows:

$$\varepsilon^{(v)} \approx -2g(1-g)\Delta_N \quad (17)$$

$$\delta^{(v)} \approx -2g[(1-2g)\Delta_N + \Delta_T] \quad (18)$$

$$\gamma^{(v)} = -\frac{1}{2}\Delta_T \quad (19)$$

Equations 17-19 make apparent the approximate relationship between the LSD and Thomsen parameters.

Consequently, the density normalized HTI stiffness matrix can be calculated by one of these parameterization methods or other similar methods known in the art for each layer. The HTI stiffness matrix varies spatially for each layer because each layer likely has different anisotropy characteristics. In addition, HTI is an exemplary anisotropic model. That is, anisotropy has various levels of complexity starting from the simplest, such as isotropic or described by two (2) parameters, to the most complex, such as triclinic or twenty-one (21) parameters. Examples of other anisotropic models between the simplest and most complex cases are orthorhombic and monoclinic models. Accordingly, the parameterization can be modified to handle more general anisotropy media that has more than one set of fractures or vertical cracks. That is, the reflectivity model can be modified to represent the different types of anisotropy. For instance, this can be done by introducing extra parameters to the linear slip deformation theory or the Hudson's penny-shaped crack theory.

After the parameterization is performed and the stiffness matrix is obtained, the stiffness matrix can be rotated so that the isotropy plane is parallel to the fracture strike. This formulation with the Bond transformation allows the isotropy plane to vary as a function of layer or equivalently depth. This rotation is performed by a Bond transformation as disclosed in Winterstein, D. F., 1990, "Velocity anisotropy terminology for geophysicists," Geophysics, 55, 1070-1088. The Bond transformation is represented below:

$$C' = MCM^T \quad (20)$$

where M is a rotation matrix, which is shown in equation (21) below:

$$M = \begin{bmatrix} \cos^2\psi & \sin^2\psi & 0 & 0 & 0 & -\sin 2\psi \\ \sin^2\psi & \cos^2\psi & 0 & 0 & 0 & \sin 2\psi \\ 0 & 0 & 1 & 0 & 0 & 0 \\ 0 & 0 & 0 & \cos\psi & \sin\psi & 0 \\ 0 & 0 & 0 & -\sin\psi & \cos\psi & 0 \\ \frac{1}{2}\sin 2\psi & -\frac{1}{2}\sin 2\psi & 0 & 0 & 0 & \cos 2\psi \end{bmatrix} \quad (21)$$

The rotation matrix M rotates the HTI stiffness matrix counterclockwise ψ about the new z-axis. In the preferred embodiment, such as represented in FIG. 1, two rotations are performed: one for the symmetry plane and one for the source-receiver azimuth. Accordingly, the general steps performed in a Bond transformation for each layer are: first, rotate media clockwise $\psi_{sym}$, and second, rotate media counterclockwise $\psi_{SR}$ to correspond to the azimuth of the source-receiver, which is equivalent to rotating media a certain angle $\psi$ according to the following equation $\psi = \psi_{SR} - \psi_{sym}$. In an alternative embodiment, such as the implementation with Fourier coefficients, only the first Bond transformation is performed (e.g., in step 202 of FIG. 2).

Because the Bond transformation allows the isotropy plane to vary as a function of layer or equivalently depth, the resulting Bond transformation simplifies to the form of the monoclinic stiffness matrix:

$$C' = \begin{bmatrix} c'_{11} & c'_{12} & c'_{13} & 0 & 0 & c'_{16} \\ c'_{12} & c'_{22} & c'_{23} & 0 & 0 & c'_{26} \\ c'_{13} & c'_{23} & c'_{33} & 0 & 0 & c'_{36} \\ 0 & 0 & 0 & c'_{44} & c'_{45} & 0 \\ 0 & 0 & 0 & c'_{45} & c'_{55} & 0 \\ c'_{16} & c'_{26} & c'_{36} & 0 & 0 & c'_{66} \end{bmatrix}$$

where $c'_{11} = c_{11} \cos^4 \psi + 2(c_{13} + 2c_{55}) \sin^2 \psi \cos^2 \psi + c_{33} \sin^4 \psi$ $c'_{12} = c_{13}(\cos^4 \psi + \sin^4 \psi) + (c_{11} + c_{33} - 4c_{55}) \sin^2 \psi \cos^2 \omega$ $c'_{13} = c_{13} \cos^2 \psi + (c_{33} - 2c_{44}) \sin^2 \psi$ $c'_{22} = c_{33} \cos^4 \psi + 2(c_{13} + 2c_{55}) \cos^2 \psi \sin^2 \psi + c_{11} \sin^4 \psi$ $c'_{32} = (c_{33} - 2c_{44}) \cos^2 \psi + c_{13} \sin^2 \psi$ $c'_{33} = c_{33}$ $c'_{16} = (c_{11} - 2c_{55} - c_{13}) \cos^3 \psi \sin \psi + (c_{13} + 2c_{55} - c_{33}) \cos \psi \sin^3 \psi$ $c'_{26} = (c_{13} + 2c_{55} - c_{33}) \cos^3 \psi \sin \psi + (c_{11} - 2c_{55} - c_{13}) \cos \psi \sin^3 \psi$ $c'_{36} = (c_{13} + 2c_{44}) \cos \psi \sin \psi$ $c'_{44} = c_{44} \cos^2 \psi + c_{55} \sin^2 \psi$ $c'_{45} = (c_{55} - c_{44}) \cos \psi \sin \psi$ $c'_{55} = c_{55} \cos^2 \psi + c_{44} \sin^2 \psi$ $c'_{66} = c_{55} \cos 2\psi + (c_{11} - 2c_{13} + c_{33}) \cos^2 \psi \sin^2 \psi$ The stiffness matrix must be positive definite, which places certain bounds on the parameters. Because the determinant of a positively defined matrix is always positive, it is easy to check before performing any rotations. The following equation represents the HTI matrix, $$c^{(HTI)} = \begin{bmatrix} c_{11} & c_{13} & c_{13} & 0 & 0 & 0 \\ c_{13} & c_{33} & c_{33} - 2c_{44} & 0 & 0 & 0 \\ c_{13} & c_{33} - 2c_{44} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{55} \end{bmatrix} \quad (22)$$

which can be reduced to show the determinant of the submatrix as $$\det \begin{bmatrix} c_{11} & c_{13} & c_{13} \\ c_{13} & c_{33} & c_{33} - 2c_{44} \\ c_{13} & c_{33} - 2c_{44} & c_{33} \end{bmatrix} > 0 \quad (23)$$

hence. $4c_{44}(c_{11}c_{33} - c_{11}c_{44} - c_{13}^2) > 0$

Further, because $c_{11} > 0$ $c_{44} > 0$ $c_{55} > 0$ for the linear slip formulation this implies $$\lambda > -\frac{2}{3}\mu,$$

$$(c_{33} - c_{44}) > \frac{c_{13}^2}{c_{11}}$$

where as discussed above, $\lambda$ and $\mu$ are the two parameters in linear elasticity representing isotropic materials that satisfy Hooke's law in three-dimensions. The two parameters together constitute a parameterization of the elastic moduli for homogeneous isotropic media. This may be further restricted by adding the restriction that the Poisson ratio is positive, then $\lambda > 0$.

Referring to FIG. 1, the rotated stiffness matrices obtained in step 102 can be used as inputs to model the Zoeppritz reflectivity in step 104. For rotated orthorhombic media, the reflection coefficients may be calculated as disclosed by Schoenberg, M. and Protázio, J., 1992, 'Zoeppritz' rationalized and generalized to anisotropy: Journal of Seismic Exploration, 1, 125-144. In another embodiment, the approximate Linearized Zoeppritz equation is solved as disclosed by, Vavryčuk, V. and Pšenčík, I., 1998, "PP-wave reflection coefficients in weakly anisotropic elastic media," Geophysics, 63, 6, pp. 2129-2141, to obtain the Zoeppritz reflectivity. Alternatively, the Linearized Zoeppritz equation disclosed by Pšenčík, I., and J. L. Martins, 2001, "Properties of weak contrast PP reflection/transmission coefficients for weakly anisotropic elastic media," Studia Geophysica et Geodaetica, 45, pp. 176-199 may be used.

In yet another embodiment, the approximate linearized Zoeppritz equation 7 of Pšenčík and Martins can be written in terms of a sine and cosine series (Fourier coefficients) similar to equation (1):

$R_{PP}(\phi,\theta) = \tilde{u}_0 + \tilde{u}_2 \cos(2\phi) + \tilde{v}_2 \sin(2\phi) + \tilde{u}_4 \cos(4\phi) + \tilde{v}_4 \sin(4\phi)$ (24)

where $$\tilde{u} = A_0 + B_0 \sin^2\theta + C_0 \sin^2\theta \tan^2\theta$$

$$\tilde{u}_2 = \sin^2\theta(B_{C2} + C_{C2}\tan^2\theta)$$

$$\tilde{v}_2 = \sin^2\theta(B_{S2} + C_{S2}\tan^2\theta)$$

$$\tilde{u}_4 = C_{C4} \sin^2\theta \tan^2\theta$$

$$\tilde{v}_4 = C_{S4} \sin^2\theta \tan^2\theta \quad (25)$$

where $$A_0 A_{iso} + \frac{1}{2}\Delta\varepsilon_z$$

$$B_0 = B_{iso} + \left(\frac{1}{4}\Delta\delta_x + \frac{1}{4}\Delta\delta_y - \frac{1}{2}\Delta\varepsilon_z - 2g\Delta\gamma_x - 2g\Delta\gamma_y\right)$$

$$B_{C2} = \left(\frac{1}{4}(\Delta\delta_x - \Delta\delta_y) - 2g(\Delta\gamma_x - \Delta\gamma_y)\right)$$

$$B_{S2} = \frac{1}{2}(\Delta\chi_z - 4g\Delta\varepsilon_{45})$$

$$C_0 = C_{iso} + \frac{1}{16}(3\Delta\varepsilon_x + 3\Delta\varepsilon_y + \Delta\delta_z)$$

$$C_{C2} = \frac{1}{4}(\Delta\varepsilon_x - \Delta\varepsilon_y)$$

$$C_{S2} = \frac{1}{4}(\Delta\varepsilon_{16} + \Delta\varepsilon_{26})$$

$$C_{C4} = \frac{1}{16}(\Delta\varepsilon_x + \Delta\varepsilon_y - \Delta\delta_z)$$

$$C_{S4} = \frac{1}{8}(\Delta\varepsilon_{16} - \Delta\varepsilon_{26})$$

where $\Delta\delta_x$, $\Delta\delta_y$, $\Delta\delta_z$, $\Delta\varepsilon_x$, $\Delta\varepsilon_y$, $\Delta\varepsilon e_z$, $\Delta\gamma_x$, $\Delta\varepsilon_y$, $\Delta\chi_z$, $\Delta\varepsilon_{16}$, $\Delta\varepsilon_{26}$ and $\Delta\varepsilon_{45}$ are the changes in weak anisotropy parameters between the layers. The parameters $A_{iso}$, $B_{iso}$ and $C_{iso}$ are a result of changes in the background isotropic parameters and are identical to that found in the AVO literature.

Referring to step 204 of FIG. 2, The resulting angle dependent Fourier coefficients can be treated as reflection coefficients from which a reflectivity series can be constructed. In another embodiment, the azimuthal reflectivity can be generated using equation (24) which can then be compared to angle of incidence/azimuth similar to FIG. 1.

The reflectivity for each interface results in a reflectivity series. The interface is defined by layer boundary between the upper and lower mediums. This interface occurs at a specific depth or equivalently time. Each medium is characterized by the rotated anisotropic stiffness matrix. Referring to FIG. 1, these reflectivity series can be calculated for the same azimuths and angles of incidence as the input data using the means discussed above, as shown in step 104. The resulting reflectivity series is then convolved with a wavelet in step 106 for comparison to the input angle-azimuth stacks.

Referring to FIG. 2, in another embodiment, the reflectivity series are calculated for the same angles of incidence and Fourier coefficients $u_n(\theta)$, $v_n(\theta)$ as input to the inversion. Once again the reflectivity is calculated for each interface, this time using equation (25) from which an angle-Fourier coefficient reflectivity series can be constructed (step 204 of FIG. 2). Each of these reflectivity series are then convolved with a wavelet (step 206 of FIG. 2) for comparison with the input angle-azimuthal Fourier coefficient data.

Consequently, according to one aspect, the forward model component for each layer can begin with calculation of the HTI stiffness matrix (step 102 of FIG. 1), using preferably the linear slip parameterization. Alternatively, the HTI stiffness matrix can be calculated using other equivalent parameterizations such as the Hudson theory or the Thomsen parameterization. The stiffness matrix is then rotated using a Bond Transformation so that the isotropy symmetry plane is referenced with respect to true North, thereby resulting in a monoclinic stiffness matrix. The reflectivity, or reflection coefficient, is then calculated using the anisotropic Zoeppritz equation (step 104 of FIG. 1). Alternatively, the reflectivity is calculated using a linearization of the Zoeppritz equation. If the linearization is used then the Weak Anisotropy Parameters are also calculated. In one embodiment, including when the inputs are angle stacks, the reflectivity is calculated for each azimuth, angle of incidence, and interface. Accordingly, each azimuth and angle of incidence has a reflectivity series, which, when convolved with a wavelet, represents a synthetic seismic trace (step 106 of FIG. 1). Synthetic seismic traces are calculated for a variety of source-receiver azimuths and angle of incidences that represent the seismic data actually recorded.

In another aspect of the present disclosure, the forward model component can begin with calculation of the Fourier coefficients that characterize the azimuthal reflectivity $R(\phi,\theta)$ (step 202 of FIG. 2). In one embodiment, a reflectivity series is calculated for each Fourier coefficient, angle of incidence, and interface (step 204 of FIG. 2). These reflectivity series are then convolved with a wavelet to generate a synthetic Fourier coefficient traces (step 206 of FIG. 2) which can then be directly compared to the equivalent input Fourier coefficients or summed using equation (25) to generate synthetic azimuth, angle stacks which may be compared to the azimuth angle stack input data.

The forward modeling step has been discussed above. According to one aspect, the calculated synthetic seismic traces from the forward modeling step serve as inputs to the inversion component of the present disclosure (FIGS. 1 and 2). As described, the reflectivity calculations of the present disclosure are nonlinear, requiring a nonlinear inversion approach. In one embodiment of the disclosure, a Monte-Carlo inversion, using simulated annealing, is used to perform this non-linear inversion. This technique is disclosed in P. J. M. van Laarhoven and E. H. L. Aarts, "Simulated Annealing: Theory and Applications," Kluwer Academic Publishers, 1987. One example of the Monte-Carlo inversion is the CGG-Veritas StratiSI AZ software. The Monte-Carlo technique for simulated annealing is used to deal with highly nonlinear problems where a complex solution space exhibits global and local minima. This is the case of the azimuthal inversion where the objective function $f$ to be minimized is a combination of isotropic and anisotropic properties resulting in a seven (7)-dimension solution space. The simulated annealing is a random walk in the solution space where the probability P to accept or reject each step (or perturbation) is based on the Metropolis criterion: $P = e^{\wedge}(-\Delta f/t)$.

In other words, an increase in the objective function (i.e. a deterioration of the solution) is accepted with a probability decreasing with the temperature t. Hence it is possible to escape local minima. It has been demonstrated that by carefully controlling the rate of cooling of the temperature, the global optimum can be reached as disclosed by P. J. M. van Laarhoven and E. H. L. Aarts, *Simulated Annealing: Theory and Applications*, Kluwer Academic Publishers, 1987. Initially, when the annealing temperature is high, some large increases in the objective function are accepted and some areas far from the optimum are explored. As the inversion continues and the temperature falls, fewer uphill excursions are tolerated. The temperature should reflect the complexity of the cost function to minimize in term of local minimum and level of the thresholds between minima. Great care has to be paid to the chosen cooling schedule including the step size of each property to invert. Any reasonable starting point and annealing parameters will slowly converge to very near the correct global solution. However, if the temperature cools down too rapidly, the solution will converge to an incorrect local solution.

As the azimuthal inversion progresses, the impact of each perturbation (isotropic or anisotropic) on the cost function is computed. Based on the Metropolis criterion described above, the random walk iteratively goes through a path that minimizes the data misfit (i.e. all azimuthal-incidence angle stacks simultaneously) and avoid penalties in the regularization term. Every time a perturbation is accepted, the model is updated accordingly and becomes the new starting point of the random walk, theoretically equivalent to a stationary Markov chain.

The data misfit term or function is the difference between the model (synthetic) and real seismic data. In one aspect, the input seismic data can include either angle stacks for a variety of azimuths or alternatively Fourier coefficients at a variety of angles of incidence. In one embodiment, the (angle, azimuth) stack data may be calculated using ray tracing and a mapping between offset and angle of incidence. In another embodiment, the Fourier coefficients can be calculated from the angle stacks using a Fourier transform. The input angle-azimuth stacks are created using a controlled amplitude processing flow outlined by Gray, D., Schmidt, D., Nagarajappa, P., Ursenbach, C., and Downton J., 2009, "CACP azimuthal processing," CSPG CSEG CWLS joint convention.

The synthetic data is modeled based on some initial layered elastic model defined in the time domain. The initial model is iteratively perturbed using simulated annealing to find a global solution which minimizes the objective function which is function of the data misfit and a regularization term. The algorithm perturbs the layer P-wave velocity, Vp, S-wave velocity, Vs, and density, ρ and anisotropic parameters such as the normal and tangential weaknesses. As the algorithm perturbs the different parameters, the anisotropic elastic parameters become closer to the actual earth's parameters and the misfit function becomes smaller. These parameters can be perturbed independently or coupled via relationships such as the Gardner's relation linking Vp and ρ. As known in the art, Gardner's empirical equation is often used to estimate density from P-wave velocity, Vp, where $\rho=a\, Vp^b$. Because the Gardner's relation represents an empirical relationship, other empirical relationships can be used to perturb the parameters. For example, other empirical relationships can relate S-wave and density or linear and polynomial relations. In addition to the elastic parameters, the method also perturbs the time-thickness of the micro-layers so as to reduce the data misfit and enhance lateral coherence. As discussed above, the objective function also contains a regularization term. This regularization term includes a 3D spatial continuity constraint to help attenuate the effects of random noise.

According to one aspect of the invention, the data misfit function is written in terms of Fourier coefficients, which allows for construction of misfit weighting functions that decouple the fracture parameter estimation from the density, P-wave and S-wave background velocity estimation. For HTI media, $u_2$, $u_4$, $v_2$, and $v_4$ Fourier coefficients are primarily a function of the normal and tangential weaknesses given a background Vp/Vs ratio. If the normal and tangential weaknesses are known, the density, P-wave and S-wave velocities are only a function of the angle dependent $u_0(\theta)$ term. One embodiment of the present disclosure solves this nonlinear problem in a bootstrap fashion 1) first assuming there is no anisotropy solve for the density P-wave and S-wave velocities primarily focusing on the $u_0(\theta)$ misfit; 2) then using P-wave to S-wave velocity ratio, solve for the anisotropic parameters primarily focusing on the $u_2(\theta)$, $u_4(\theta)$, $v_2(\theta)$, and $v_4(\theta)$ misfit; and 3) and then combine the whole problem using a weighting misfit function. In addition regularization terms are used in each step.

Referring to FIG. 1, according to one aspect of the invention, after the synthetic seismic traces are generated in step 106, the data misfit term is calculated in step 108 by measuring the difference between the synthetic and real data. The real data input includes angle-azimuths stack information collected for the particular formation. The objective function may be calculated by combining the data misfit term and at least one regularization term, such as 3D spatial continuity constraints, as shown in step 110. Step 112 involves determining whether the output of step 110, i.e., perturbation of the model according to the aspects of the present invention, is acceptable. One approach to determine whether the output is acceptable is by using the Metropolis criterion: $P=e^{(-\Delta f/t)}$. Generally, a perturbation is accepted if it reduces the objective function, but occasionally a perturbation will be accepted even if the misfit/objective function is larger, allowing for the whole nonlinear solution space to be explored. If the perturbation is accepted, the input model is updated at step 114. As seen, the initial input model is a priori model. As shown, this model is updated if the perturbation is accepted. The updated model is used as the input for subsequent modeling, looping, or perturbations, if it is determined that additional perturbations are necessary or desired, as shown in step 116. For instance, one criteria for determining whether to continue the perturbations and updating of the model is to iterate a minimum number of times or until convergence. Through the various iterations, the model slowly evolves to the final one output from the inversion. The a priori model is held constant throughout and might be used as a constraint in the objective function. Also, the perturbation may be focused on a particular spatial location (layer, inline, crossline). If it is determined that the looping of the process may stop, e.g., the desired number of iterations or convergence have been reached, the data output comprises the elastic parameters estimates of the particular formation, as shown in step 118.

Referring to FIG. 2, in an alternative embodiment, according to one aspect of the invention, after the synthetic seismic traces are generated in step 206, the data misfit term is calculated in step 208 by measuring the difference between the synthetic data and the input data. The input data includes angle-azimuthal Fourier coefficients, such as those of FIG. 3, calculated for the particular formation as discussed above. The remaining steps are relatively similar to the embodiment described in FIG. 1. For instance, the objective function may be calculated by combining the data misfit term and at least one regularization term, such as 3D spatial continuity constraints, as shown in step 210. Step 212 involves determining whether the output of step 110, i.e., perturbation of the model according to the aspects of the present invention, is acceptable. One approach to determine whether the output is acceptable is by using the Metropolis criterion: $P=e^{(-\Delta f/t)}$. If the perturbation is accepted, the input model is updated at step 214. The updated model is used as the input for subsequent modeling, looping, or perturbations, if it is determined that additional perturbations are necessary or desired (step 216). Accordingly, Fourier coefficients may serve as part of the input into the forward modeling process. Exemplary criteria for determining whether to continue the perturbations and updating of the model is to iterate a minimum number of times or until convergence. Also, the perturbation may be focused on a particular spatial location (layer, inline, crossline). If it is determined that the looping of the process may stop, e.g., the desired number of iterations or convergence have been reached, the data output comprises the elastic parameters estimates of the particular formation (step 218).

The simultaneous characteristic of the azimuthal inversion of the present disclosure allows a better control of the AVAZ effect. Also, the symmetry axis estimation is non-unique when inverting for a single azimuthal-incidence angle stack. However, this ambiguity disappears when all the stacks are inverted simultaneously.

In addition to the isotropic initial layered model, the user can also specify the anisotropic model. It is assumed that the fractures follow a power law or fractal relationship with the isotropy azimuth governed by the regional stress regime.

The outputs of the various embodiments of the present disclosure provide for estimates of isotropic and anisotropic parameters including crack density, which can be used in various applications such as estimating the principal stresses as disclosed by provisional application with Application No. 61/298,098, filed on Jan. 25, 2010, and US application Ser. No. 13/012,110, filed on Jan. 24, 2011, both entitled Methods and Systems for Estimating Stress Using Seismic Data.

Figure 4:
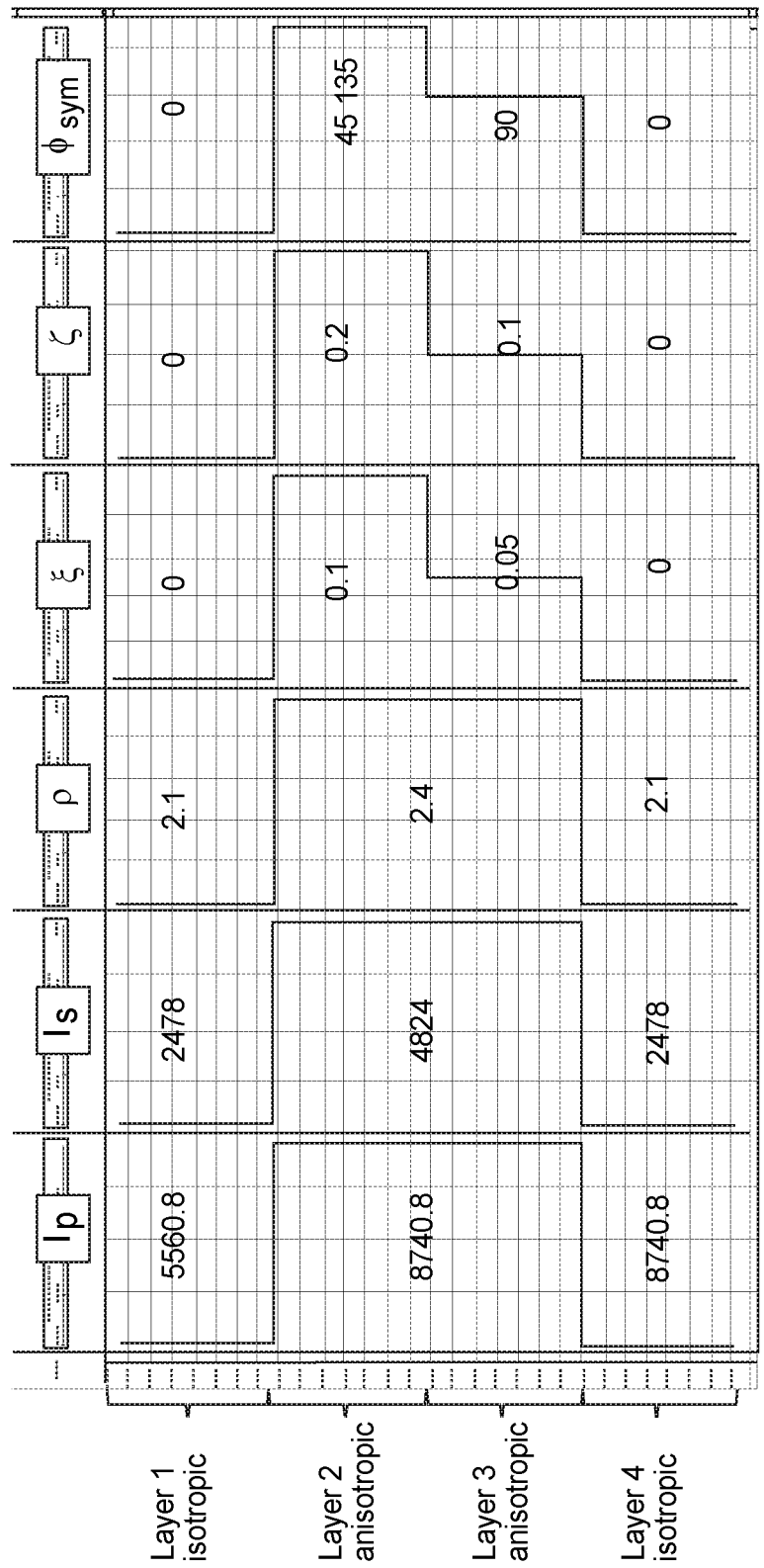
FIG. 4 is the input model used to generate the synthetic seismic data.
Figure 5:
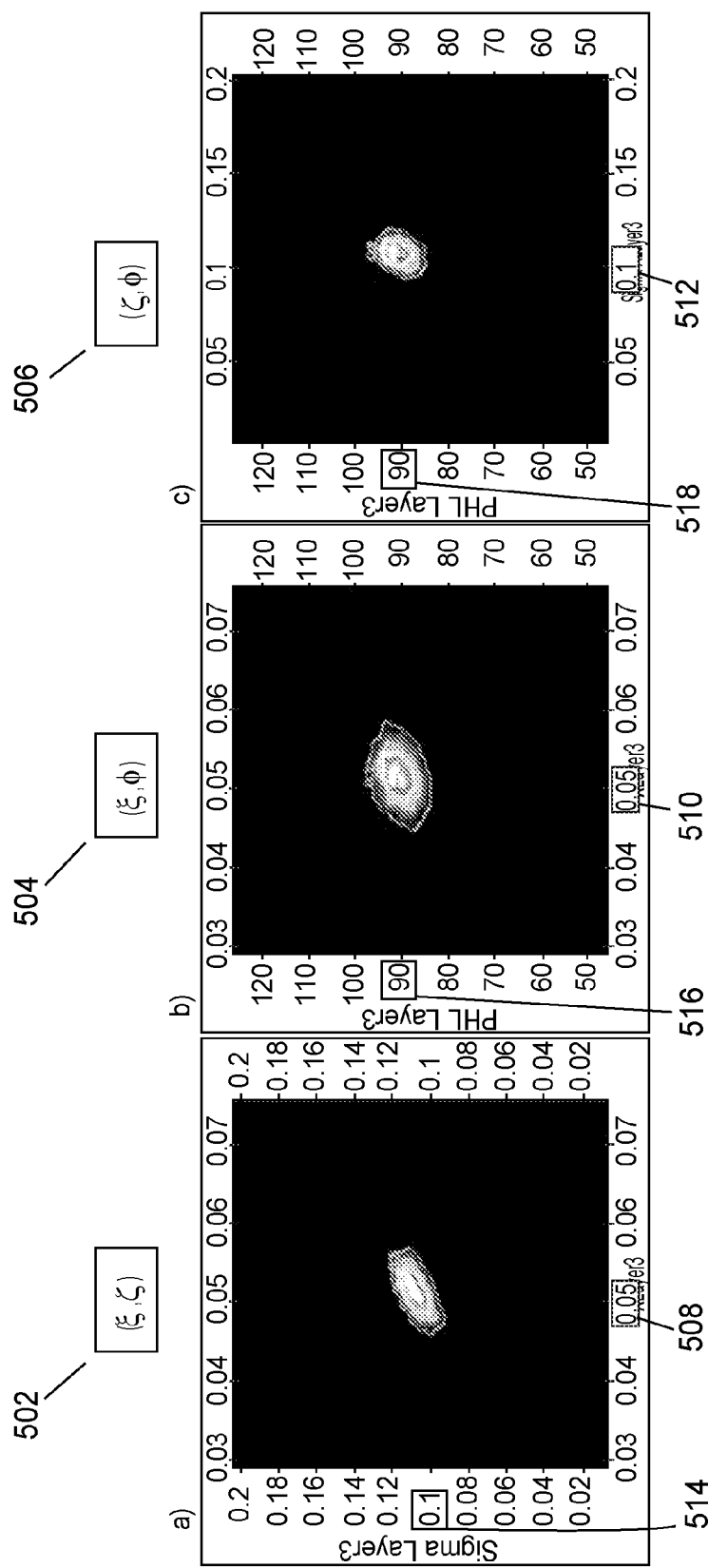
FIG. 5 is the cross-plot showing parameter estimates for crack density, $\xi$, fluid term, $\zeta$, and symmetry axis, $\phi$.

Referring to FIGS. 4-5, a synthetic example is shown to demonstrate the results obtained from one embodiment of the present disclosure. FIG. 4 shows the input parameters used to generate the synthetic data for two tests that were performed. Two different models were generated; one with the second layer having a 45 degree symmetry axis and the other with the second layer having a 135 degrees symmetry axis. As shown, both the second and third layers are anisotropic with different symmetry planes. Accordingly, this synthetic example breaks the assumptions made by the Rüger equation. The seismic data was forward modeled using the linearized Zoeppritz equation generating reflectivity for angle of incidence stacks at 10, 20, 30 and 40 degrees and for azimuths at 0, 30, 60, 90, 120, and 150 degrees. These angle-azimuth stacks were then convolved with a wavelet to generate synthetic seismic traces. Data was generated for a 3D volume where the parameters were held laterally invariant. The synthetic seismic data were then inverted using the simultaneous anisotropic inversion.

Referring to FIG. 5, a cross-plot of the parameter estimates of crack density, $\xi$, fluid term, $\zeta$, and symmetry axis, $\phi$, for Layer 3 of the synthetic example from FIG. 4, where Layer 3 exhibits anisotropic characteristics. Referring to FIG. 5, it is obtained by extending the one dimensional parameters of FIG. 4 laterally. Boxes 502, 504, and 506 represent 2D projections of the 3D solution space. As seen, FIG. 5 displays the anisotropic parameter estimates for the third layer as a probability distribution, which is one way to perform an error analysis of the method used by seeing how well the estimates converge to the right solution. As seen, the x-axis of box 502 is labeled Xi_Layer3 for the crack density, $\xi$, and the y-axis of box 502 is labeled Sigma_Layer3 for the fluid term, $\zeta$. The x-axis of box 504 is labeled Xi_Layer3 for the crack density, $\xi$, and the y-axis of box 504 is labeled Phi_Layer3 for the symmetry axis, $\phi$. The x-axis of box 506 is labeled Sigma_Layer3 for the fluid term, $\zeta$, and the y-axis of box 506 is labeled Phi_Layer3 for the symmetry axis, $\phi$. The preferred solution is labeled on the respective axes. The preferred solutions 514 and 512 of boxes 502 and 506, respectively, show the estimate of fluid term, $\zeta$, as 0.1, which matches up with the ideal solution in FIG. 4. The preferred solutions 508 and 510 of boxes 502 and 504, respectively, show the estimate of crack density, $\xi$, as 0.05, which matches up with the ideal solution in FIG. 4. The preferred solutions 516 and 518 of boxes 504 and 506, respectively, show the estimate of symmetry axis, $\phi$, as 90, which also matches up with the ideal solution in FIG. 4. As seen, FIG. 5 shows the results from one embodiment of the present disclosure correlate substantially with the ideal solution of FIG. 4, with only a small amount of scatter about the ideal solution.

Figure 6:
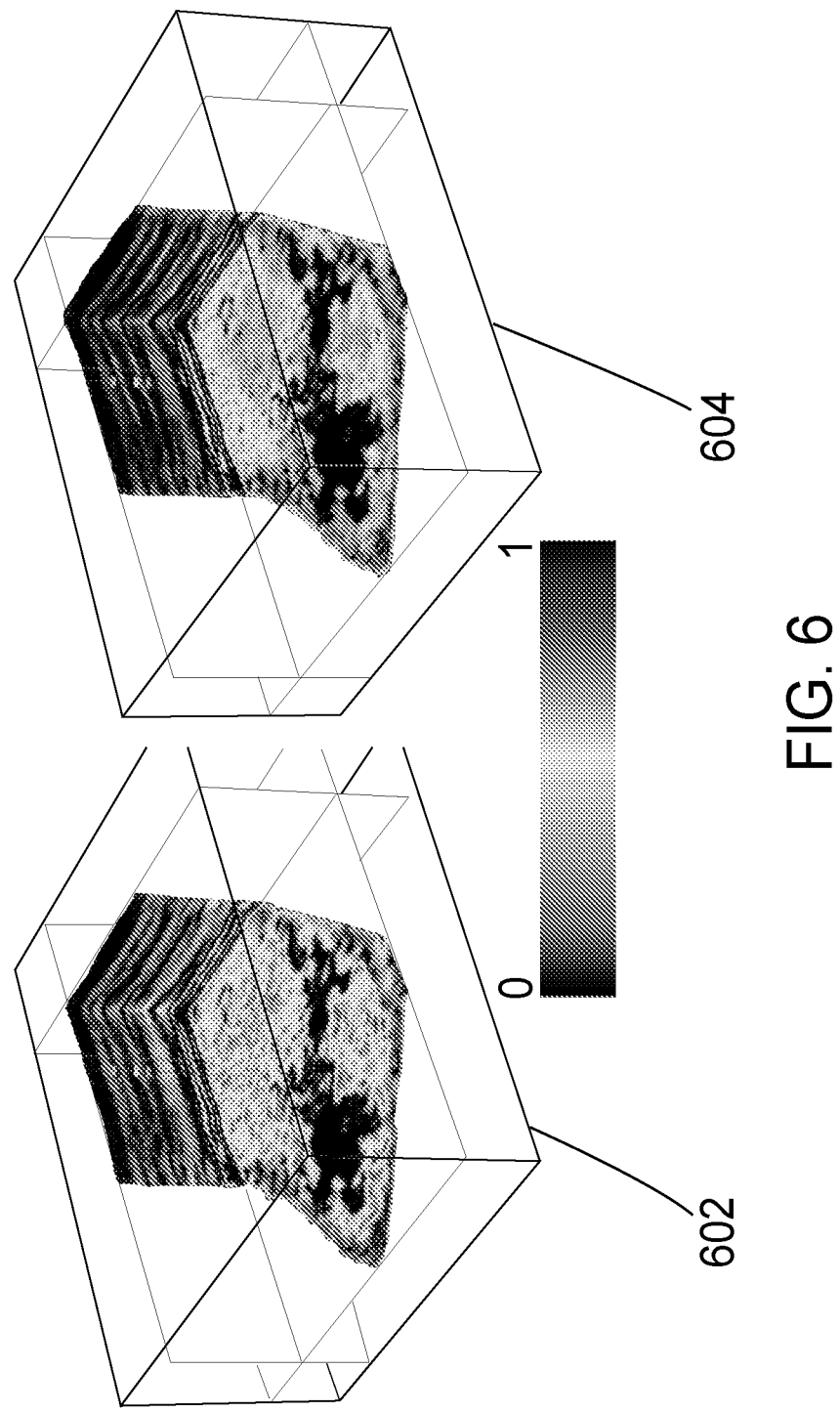
FIG. 6 is the estimate of the normal and tangential weaknesses $\delta_N$ a) and $\delta_T$ b) for the real seismic dataset.

In a second example of the disclosure, the inversion method of the present disclosure was implemented on a 3D seismic dataset from North-Eastern British Columbia. Referring to FIG. 6, the estimate of the normal and tangential weaknesses for the real seismic dataset are shown are shown, where normal weakness, $\delta_N$, is demonstrated by the number 602, and tangential weakness, $\delta_T$, is represented by the number 604. As mentioned above, in fractured media the tangential weakness is proportional to the crack density while the normal weakness is also a function of the crack aperture and fluid. When both normal and tangential weaknesses are zero (0), the media is isotropic. The media exhibits various anisotropic characteristics as the normal and tangential weaknesses approach one (1). As seen, FIG. 6 is generally the display of the analyzed results of seismic data using one of the embodiments of this disclosure. It is a map view of the subterranean formation at specific depth or time where the vertical axis is time or depth. It should be understood that mathematical transformations can be applied to the results of the present disclosure to display the results in terms of the different theories, e.g., Hudson, LSD, or Thomsen parameters. For instance, seismic data analyzed using the methods and systems of the present disclosure solve for parameters in terms of the Hudson theory, and mathematical transformation can be performed after-the-fact to display the estimated results in terms of LSD theory or Thomsen parameters.

The embodiments of the systems of the present disclosure may include one or more computer systems to implement the various methods of the present disclosure. One exemplary computer system may include a central processing unit (CPU), which may be any general-purpose CPU. The present disclosure is not restricted by the architecture of the CPU or other components of the systems of the present disclosure as long as the CPU and other components support the inventive operations as described herein. The CPU may execute the various logical instructions according to embodiments of the present disclosure. For example, the CPU may perform azimuthal simultaneous elastic inversion according to the exemplary flow diagrams described above.

In addition, the exemplary computer system may also include random access memory (RAM), which may be SRAM, DRAM, SDRAM, or the like. The embodiments may also include read-only memory (ROM) which may be PROM, EPROM, EEPROM, or the like. The RAM and ROM hold user and system data and programs, as is well known in the art.

The exemplary computer system also includes input/output (I/O) adapter, communications adapter, user interface adapter, and display adapter. I/O adapter, user interface adapter, and/or communications adapter may, in certain embodiments, enable a user to interact with the computer system in order to input information and obtain output information that has been processed by the computer system.

The I/O adapter preferably connects to one or more storage device(s), such as one or more of hard drive, compact disc (CD) drive, floppy disk drive, tape drive, etc. to the exemplary computer system. The storage devices may be utilized when the RAM is insufficient for the memory requirements associated with storing data for operations of the elements described above (e.g., clam adjudication system, etc.). The communications adapter is preferably adapted to couple the computer system to a network, which may enable information to be input to and/or output from the computer system via the network (e.g., the Internet or other wide-area network, a local-area network, a public or private switched telephony network, a wireless network, any combination of the foregoing). The user interface adapter couples user input devices, such as keyboard, pointing device, and microphone and/or output devices, such as speaker(s) to the exemplary computer system. The display adapter is driven by the CPU to control the display on the display device to, for example, display the output of the azimuthal simultaneous elastic inversion, such as shown in FIGS. 5 and 6.

It shall be appreciated that the present invention is not limited to the architecture of the exemplary computer system. For example, any suitable processor-based device may be utilized for implementing the various elements described above (e.g., software for presenting the user interfaces, claim adjudication system, etc.), including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing azimuthal simultaneous elastic inversion of seismic data of a subterranean formation, the method comprising:
    forward modeling including
        determining a HTI stiffness matrix from the seismic data, using parameterization, for at least one azimuth and at least one angle of incidence from said seismic data, wherein the HTI stiffness matrix varies spatially with respect to one or more layers, applying a Bond transformation to the HTI stiffness matrix to rotate an isotropy symmetry plane to be referenced with respect to true North, and calculating a reflectivity series for the at least one azimuth angle and the at least one angle of incidence using one or more reflection coefficients, wherein anisotropy media is incorporated; and
    determining parameters to be used by the parameterization in a next iteration,
    wherein the forward modeling and the determining of the parameters are performed iteratively using a central processing unit of a computer.

2. The method of claim 1 wherein the parameterization is performed with a method selected from the group consisting of the linear slip deformation theory, the Hudson's penny-shaped crack theory, and Thomsen parameters.

3. The method of claim 1 wherein the one or more reflection coefficients is calculated using a linearized Zoeppritz equation, where the HTI stiffness matrix is expressed in terms of weak anisotropy parameters.

4. The method of claim 1, wherein the forward modeling further comprises:
    convolving a wavelet and the reflectivity series for the at least one azimuth and the at least one angle of incidence to obtain one or more synthetic seismic traces for the at least one azimuth and the at least one angle of incidence.

5. The method of claim 4 further comprising:
    estimating elastic parameters by inverting the synthetic seismic traces.

6. The method of claim 1 further comprising at each iteration:
    perturbing an initial model based on the parameters including: P-wave velocity, Vp, S-wave velocity, Vs, and density, $\rho$.

7. The method of claim 6, wherein the initial model uses anisotropic parameters.

8. The method of claim 6 wherein the parameters are perturbed independently.

9. The method of claim 6 wherein the perturbing of the parameters is based on a defined relationship.

10. The method of claim 9 wherein the defined relationship is an empirical relationship linking two of the parameters.

11. The method of claim 10 wherein the empirical relationship is a relationship linking the P-wave velocity, Vp and the density, $\rho$.

12. The method of claim 6 further comprising perturbing a time-thickness of microlayers so as to reduce a data misfit and enhance a lateral coherence.

13. The method of claim 6 wherein a simulated annealing is used to find a global solution which minimizes an objective function.

14. The method of claim 13 wherein the objective function contains a data misfit calculated based on a difference between simulated data obtained using the reflectivity series and the seismic data and a regularization term.

15. The method of claim 14 wherein the regularization term includes a three dimensional spatial continuity constraint to help attenuate the effects of random noise.

16. The method of claim 15 wherein each iteration is performed on all azimuthal-incidence angle stacks simultaneously such that the data misfit is minimized and penalties in the regularization term are avoided.

17. A method for performing azimuthal simultaneous elastic inversion, the method comprising:
    forward modeling including
        determining a HTI stiffness matrix from the seismic data, using parameterization, for at least one azimuth and at least one angle of incidence from said seismic data, wherein the HTI stiffness matrix varies spatially with respect to one or more layers,
        applying a Bond transformation to the HTI stiffness matrix to rotate an isotropy symmetry plane to be referenced with respect to true North,
        calculating a reflectivity series for the at least one azimuth angle and the at least one angle of incidence using one or more reflection coefficients, wherein anisotropy media is incorporated, and obtaining one or more synthetic seismic traces by convolving the reflectivity series with a source wavelet;

determining parameters to be used by the parameterization in a next iteration; and inverting the one or more synthetic seismic traces to obtain elastic parameters estimates, wherein the forward modeling and the determining of the parameters are performed iteratively using a central processing unit of a computer.

18. The method of claim 17 wherein said reflectivity series comprises Fourier coefficients characterizing azimuthal reflectivity at a angle of incidence $\theta$, wherein said reflectivity is determined at least by $$R(\phi, \theta) = \frac{u_o}{2} + \sum_{n=1}^{N} (u_n(\theta)\cos(n\phi) + v_n(\theta)\sin(n\phi)).$$

19. The method of claim 17 wherein said inverting step comprises constructing one or more misfit weighting functions that decouple fracture parameter estimation from density, P-wave background velocity estimation, and S-wave background velocity estimation.

* * * * *

UNITED STATES PATENT AND TRADEMARK OFFICE
CERTIFICATE OF CORRECTION

PATENT NO. : 8,792,303 B2
APPLICATION NO. : 13/046447
DATED : July 29, 2014
INVENTOR(S) : Downton et al.

It is certified that error appears in the above-identified patent and that said Letters Patent is hereby corrected as shown below:

In The Specification

In Column 6, Line 37, delete "$\beta^2 = A_{55}$," and insert -- $\beta^2 = A_{55}.$ --, therefor.

In Column 6, Line 39, delete "Z=ρα," and insert -- Z=ρα. --, therefor.

In Column 15, Lines 15-16, delete "$A_0 A_{iso} + \frac{1}{2}\Delta\varepsilon_z,$" and insert -- $A_0 = A_{iso} + \frac{1}{2}\Delta\varepsilon_z$ --, therefor.

In Column 15, Line 35, delete "$\Delta\varepsilon e_z, \Delta\gamma_x, \Delta\varepsilon_y, \Delta\chi_z,$" and insert -- $\Delta\varepsilon_z, \Delta\gamma_x, \Delta\gamma_y, \Delta\chi_z,$ --, therefor.

In Column 21, Line 6, delete "telephony" and insert -- telephone --, therefor.

Signed and Sealed this
Twenty-fourth Day of May, 2016

Michelle K. Lee
*Director of the United States Patent and Trademark Office*